United States Patent
Schwing

[11] Patent Number: 5,826,966
[45] Date of Patent: Oct. 27, 1998

[54] LIGHTED BUMPER GUIDE

[76] Inventor: John Schwing, 2100 Fox Trail, Sioux Falls, S. Dak. 57103-6329

[21] Appl. No.: 40,037

[22] Filed: Mar. 17, 1998

[51] Int. Cl.⁶ .................................................... B60Q 1/26
[52] U.S. Cl. ................................ 362/82; 362/32; 362/800
[58] Field of Search .............................. 362/32, 82, 253, 362/800

[56] References Cited

U.S. PATENT DOCUMENTS

| D. 331,889 | 12/1992 | Kaplan | D10/114 |
|---|---|---|---|
| D. 351,115 | 10/1994 | Valdez | D10/114 |
| D. 357,882 | 5/1995 | Navarez et al. | D10/114 |
| 2,143,997 | 1/1939 | Parkinson | 362/82 X |
| 3,487,359 | 12/1969 | McClintock | 362/82 |
| 3,858,924 | 1/1975 | Bores | 293/69 |
| 3,933,117 | 1/1976 | Maietta | 116/28 R |
| 4,313,104 | 1/1982 | Phillips | 340/102 |
| 4,755,791 | 7/1988 | Kuroda | 340/115 |
| 4,855,878 | 8/1989 | Vu et al. | 362/66 |
| 4,924,209 | 5/1990 | Kao | 340/479 |
| 4,953,065 | 8/1990 | Kao | 362/83 |
| 4,955,577 | 9/1990 | Ching | 248/539 |
| 5,060,122 | 10/1991 | Miyoshi | 362/82 |
| 5,195,816 | 3/1993 | Moss, Jr. et al. | 362/71 |
| 5,305,704 | 4/1994 | Olaniyan | 116/28 R |

*Primary Examiner*—Stephen F. Husar

[57] ABSTRACT

A new lighted bumper guide for helping a driver ascertain the location of the ends of the bumper of their vehicle. The inventive device includes a base adapted for attachment to a bumper. The top of the base has a primary bore therein. The primary bore has upper and lower portions with the diameter of the upper portion of the primary bore being greater than the diameter of the lower portion of the primary bore so that an annular shoulder is formed between them. A light source is provided in the lower portion of the primary bore. An elongate tubular rod having opposite upper and lower ends is also provided. The rod has an annular gasket extending therearound positioned towards the lower end of the rod. The lower end of the rod is inserted into the primary bore of the base. The gasket is inserted into the upper portion of the primary bore such that the gasket rests on the shoulder defined between the upper and lower portions of the primary bore. The elongate portion of a fiber optic filament is provided in the lumen of the rod while the lens portion of the fiber optic filament is upwardly extended from the upper end of the rod.

11 Claims, 3 Drawing Sheets

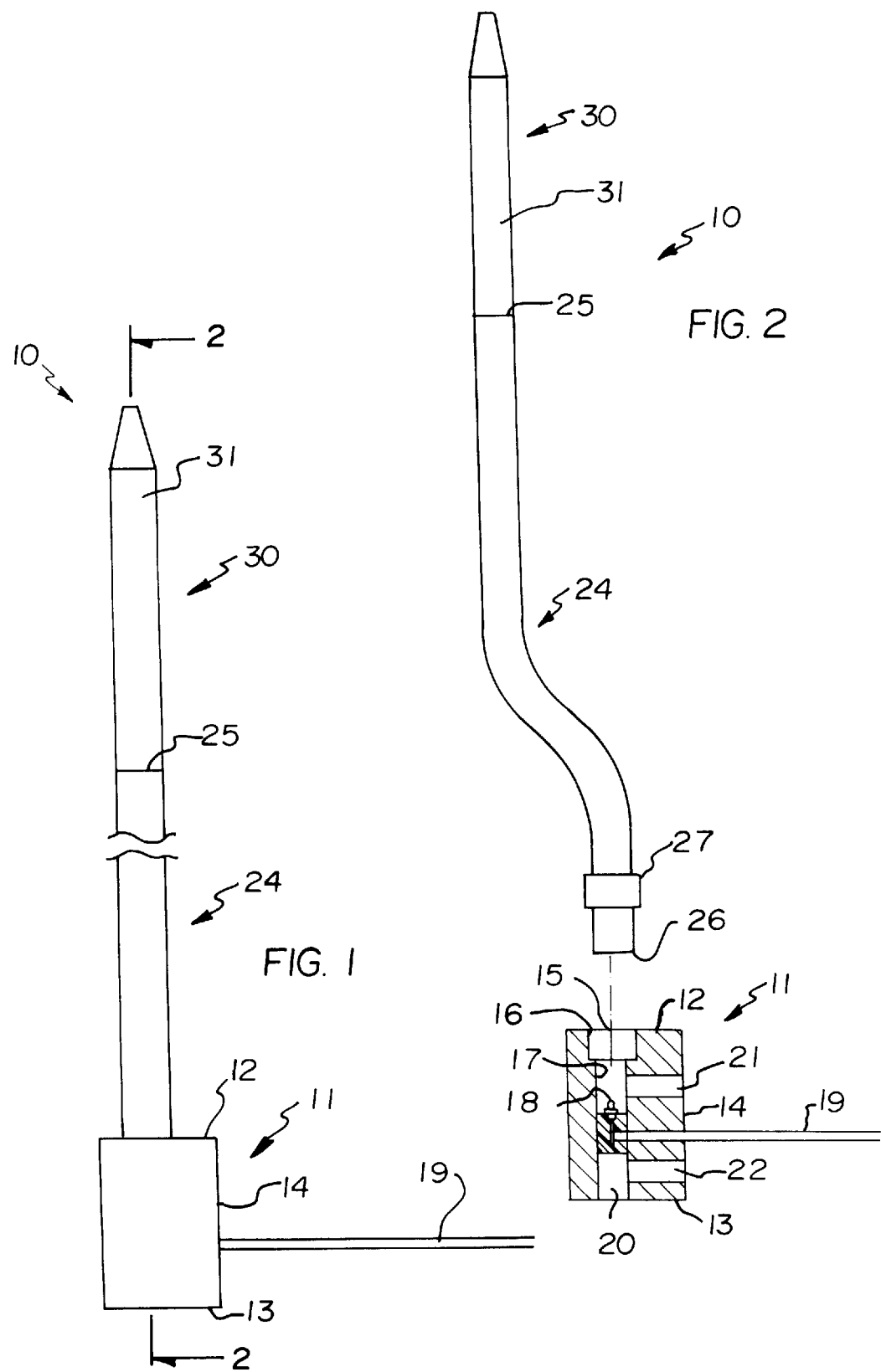

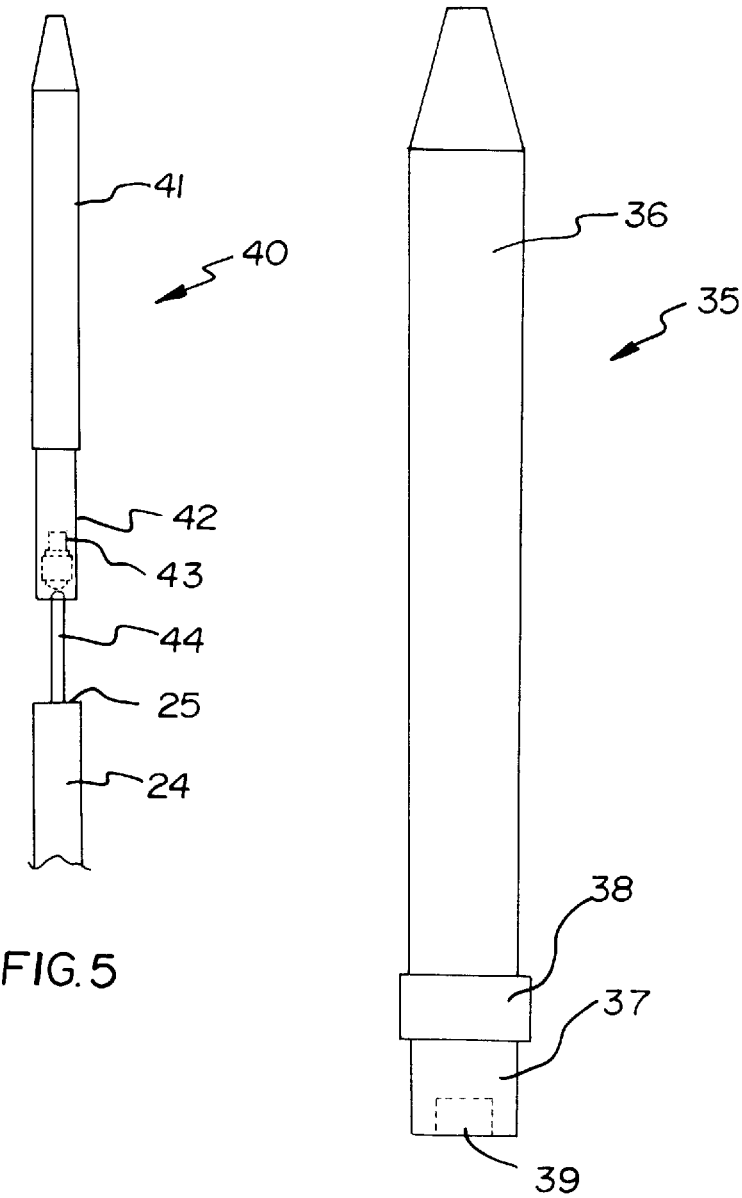

LIGHTED BUMPER GUIDE

BACKGROUND OF THE INVENTION

1. Field of the Invention

The present invention relates to lighted bumper guides and more particularly pertains to a new lighted bumper guide for helping a driver ascertain the location of the ends of the bumper of their vehicle.

2. Description of the Prior Art

The use of lighted bumper guides is known in the prior art. More specifically, lighted bumper guides heretofore devised and utilized are known to consist basically of familiar, expected and obvious structural configurations, notwithstanding the myriad of designs encompassed by the crowded prior art which have been developed for the fulfillment of countless objectives and requirements.

Known prior art lighted bumper guides include U.S. Pat. No. 3,858,924; U.S. Pat. No. 3,998,285; U.S. Pat. No. 4,020,335; U.S. Pat. No. 4,042,816; U.S. Pat. No. 4,110,818; U.S. Pat. No. 4,274,127. U.S. Pat. No. Des. 260,860; U.S. Pat. No. 4,313,104; U.S. Pat. No. 4,313,264; U.S. Pat. No. 4,755,791; U.S. Pat. No. Des. 318,132; and U.S. Pat. No. 5,056,821.

While these devices fulfill their respective, particular objectives and requirements, the aforementioned patents do not disclose a new lighted bumper guide. The inventive device includes a base adapted for attachment to a bumper. The top of the base has a primary bore therein. The primary bore has upper and lower portions with the diameter of the upper portion of the primary bore being greater than the diameter of the lower portion of the primary bore so that an annular shoulder is formed between them. A light source is provided in the lower portion of the primary bore. An elongate tubular rod having opposite upper and lower ends is also provided. The rod has an annular gasket extending therearound positioned towards the lower end of the rod. The lower end of the rod is inserted into the primary bore of the base. The gasket is inserted into the upper portion of the primary bore such that the gasket rests on the shoulder defined between the upper and lower portions of the primary bore. The elongate portion of a fiber optic filament is provided in the lumen of the rod while the lens portion of the fiber optic filament is upwardly extended from the upper end of the rod.

In these respects, the lighted bumper guide according to the present invention substantially departs from the conventional concepts and designs of the prior art, and in so doing provides an apparatus primarily developed for the purpose of helping a driver ascertain the location of the ends of the bumper of their vehicle.

SUMMARY OF THE INVENTION

In view of the foregoing disadvantages inherent in the known types of lighted bumper guides now present in the prior art, the present invention provides a new lighted bumper guide construction wherein the same can be utilized for helping a driver ascertain the location of the ends of the bumper of their vehicle.

The general purpose of the present invention, which will be described subsequently in greater detail, is to provide a new lighted bumper guide apparatus and method which has many of the advantages of the lighted bumper guides mentioned heretofore and many novel features that result in a new lighted bumper guide which is not anticipated, rendered obvious, suggested, or even implied by any of the prior art lighted bumper guides, either alone or in any combination thereof.

To attain this, the present invention generally comprises a base adapted for attachment to a bumper. The top of the base has a primary bore therein. The primary bore has upper and lower portions with the diameter of the upper portion of the primary bore being greater than the diameter of the lower portion of the primary bore so that an annular shoulder is formed between them. A light source is provided in the lower portion of the primary bore. An elongate tubular rod having opposite upper and lower ends is also provided. The rod has an annular gasket extending therearound positioned towards the lower end of the rod. The lower end of the rod is inserted into the primary bore of the base. The gasket is inserted into the upper portion of the primary bore such that the gasket rests on the shoulder defined between the upper and lower portions of the primary bore. The elongate portion of a fiber optic filament is provided in the lumen of the rod while the lens portion of the fiber optic filament is upwardly extended from the upper end of the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lighted bumper guide apparatus and method which has many of the advantages of the lighted bumper guides mentioned heretofore and many novel features that result in a new lighted bumper guide which is not anticipated, rendered obvious, suggested, or even implied by any of the prior art lighted bumper guides, either alone or in any combination thereof.

It is another object of the present invention to provide a new lighted bumper guide which may be easily and efficiently manufactured and marketed.

It is a further object of the present invention to provide a new lighted bumper guide which is of a durable and reliable construction.

An even further object of the present invention is to provide a new lighted bumper guide which is susceptible of a low cost of manufacture with regard to both materials and labor, and which accordingly is then susceptible of low prices of sale to the consuming public, thereby making such lighted bumper guide economically available to the buying public.

Still yet another object of the present invention is to provide a new lighted bumper guide which provides in the apparatuses and methods of the prior art some of the advantages thereof, while simultaneously overcoming some of the disadvantages normally associated therewith.

Still another object of the present invention is to provide a new lighted bumper guide for helping a driver ascertain the location of the ends of the bumper of their vehicle.

Yet another object of the present invention is to provide a new lighted bumper guide which includes a base adapted for attachment to a bumper. The top of the base has a primary bore therein. The primary bore has upper and lower portions with the diameter of the upper portion of the primary bore being greater than the diameter of the lower portion of the primary bore so that an annular shoulder is formed between them. A light source is provided in the lower portion of the primary bore. An elongate tubular rod having opposite upper and lower ends is also provided. The rod has an annular gasket extending therearound positioned towards the lower end of the rod. The lower end of the rod is inserted into the primary bore of the base. The gasket is inserted into the upper portion of the primary bore such that the gasket rests on the shoulder defined between the upper and lower portions of the primary bore. The elongate portion of a fiber optic filament is provided in the lumen of the rod while the lens portion of the fiber optic filament is upwardly extended from the upper end of the rod.

Still yet another object of the present invention is to provide a new lighted bumper guide that may have the light source mounted in its base to reduce the amount of vibration on the light source when compared to the amount of vibration on a light source located higher up on the elongate tube.

Still even yet another object of the present invention is to provide a new lighted bumper guide that has few moving parts for increased durability and has modular parts that are easily detachable from each other to permit convenient replacement of a single part rather than replacement of the complete device These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new lighted bumper guide according to the present invention.

FIG. 2 is a schematic exploded view of a side view of a rod having an offset and a sectional view of the base.

FIG. 5 is a schematic partial exploded side view of the optional embodiment of FIG. 4.

FIG. 6 is a schematic side view of the second fiber optic element of the present invention which may be directly inserted into the base.

DESCRIPTION OF THE PREFERRED EMBODIMENT

Figure 3:
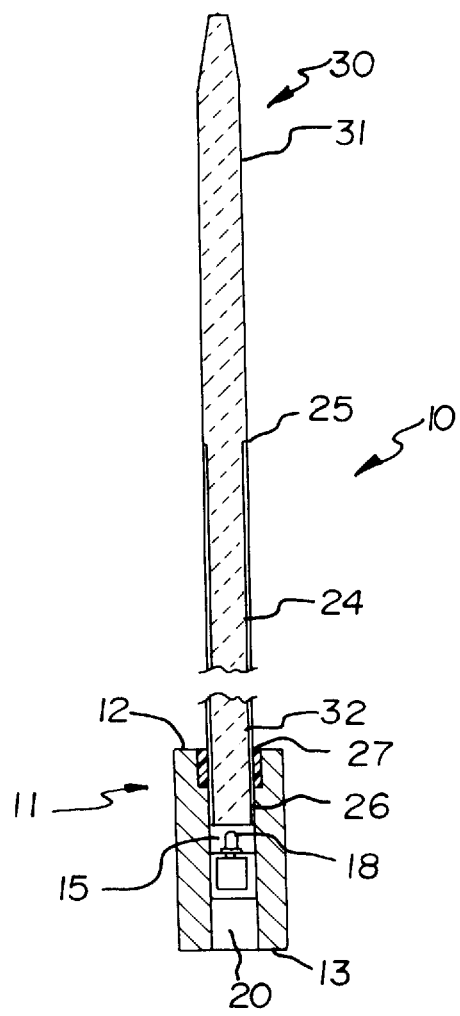
FIG. 3 is a schematic sectional view of the present invention.

With reference now to the drawings, and in particular to FIGS. 1 through 6 thereof, a new lighted bumper guide embodying the principles and concepts of the present invention and generally designated by the reference numeral 10 will be described.

In use, the lighted bumper guide 10 adapted for attachment to a bumper of a vehicle, including vehicles such as semi-trailers, RV's, pickup trucks, vans, and farm vehicles. As best illustrated in FIGS. 1 through 6, the lighted bumper guide 10 generally comprises a base 11 adapted for attachment to a bumper. The top 12 of the base 11 has a primary bore 15 therein. The primary bore 15 has upper and lower portion 17s with the diameter of the upper portion 16 of the primary bore 15 being greater than the diameter of the lower portion 17 of the primary bore 15 so that an annular shoulder is formed between them. A light source 18 is provided in the lower portion 17 of the primary bore 15. An elongate tubular rod 24 having opposite upper and lower ends 25, 26 is also provided. The rod 24 has an annular gasket 27 extending therearound positioned towards the lower end 26 of the rod 24. The lower end 26 of the rod 24 is inserted into the primary bore 15 of the base 11. The gasket 27 is inserted into the upper portion 16 of the primary bore 15 such that the gasket 27 rests on the shoulder defined between the upper and lower portions 16, 17 of the primary bore 15. The elongate portion 32 of a fiber optic filament 30 is provided in the lumen of the rod 24 while the lens portion 31 of the fiber optic filament 30 is upwardly extended from the upper end 25 of the rod 24.

In closer detail, the base 11 is adapted for attachment to a bumper and has a top 12, a bottom 13, and a side 14. The top 12 of the base 11 has a primary bore 15 extending into the interior of the base 11. As illustrated in FIG. 2, the primary bore 15 has upper and lower portions 16, 17. The upper and lower portions 16, 17 of the primary bore 15 are generally cylindrical with the diameter of the upper portion 16 of the primary bore 15 being greater than the diameter of the lower portion 17 of the primary bore 15 such that an annular shoulder is formed between them. A light source, such as a LED, 18 is provided in the lower portion 17 of the primary bore 15. The light source 18 is electrically connectable to a power source by a wire 19 extended through the base 11.

Preferably, the bottom 13 end of the base 11 has a secondary bore 20 extending into the interior of the base 11. The secondary bore 20 is generally cylindrical and is preferably generally coaxial with the primary bore 15. The secondary bore 20 is threaded to permit attachment of the base to a bumper of a vehicle. Also preferably, the side 14 of the base 11 has a pair of spaced apart generally cylindrical threaded mounting holes 21, 22 therein. One of the mounting holes is extended into lower portion 17 of the primary bore 15 while the other mounting hole is extended into the secondary bore 20. Preferably, the axis of each of the mounting holes 21, 22 is substantially perpendicular to the axes of the primary and secondary bores. The mounting holes 21, 22 are adapted for attaching the base 11 to a bumper by fasteners or by a mounting bracket.

With reference to FIGS. 1 and 3, the elongate tubular rod 24 has a lumen, and opposite upper and lower ends 25, 26. Optionally, as illustrated in FIG. 2, the rod 24 may include an offset, or bend, located towards the lower end 26 of the rod 24. The rod 24 has an annular gasket 27 extending around it. The gasket 27 is positioned towards the lower end 26 of the rod 24. Preferably, the gasket 27 comprises a resiliently compressible material such as rubber. In use, the annular gasket helps hold the rod in the primary bore and helps to dampen vibrations passing from the base through the rod. In the preferred embodiment, the gasket 27 has a length defined between the ends of the rod 24 which is generally equal to the length of the upper portion 16 of the primary bore 15 defined between the top 12 and bottom 13 of the base 11. The lower end 26 of the rod 24 and the gasket are inserted into the primary bore 15 of the base 11. The gasket 27 is inserted into the upper portion 16 of the primary bore 15 such that the gasket 27 rests on the shoulder defined between the upper and lower portions 16, 17 of the primary bore 15.

The elongate fiber optic filament 30 has opposite first and second ends, a lens portion 31 and an elongate portion 32. The lens portion 31 is located towards the first end of the fiber optic filament 30 and the elongate portion 32 is located towards the second end of the fiber optic filament 30. The fiber optic filament 30 has a generally circular cross section taken perpendicular to its length. The elongate portion 32 of the fiber optic filament 30 is provided in the lumen of the rod 24 with the second end of the fiber optic filament 30 positioned adjacent the lower end 26 of the rod 24. Ideally, plurality of heat shrink strips are wrapped around the elongate portion 32 such that the heat shrink strips are disposed between the elongate portion 32 and the rod 24. The heat shrink strips are designed for preventing the fiber optic fiber from scratching on the rod 24. The lens portion 31 of the fiber optic filament 30 upwardly extends from the upper end 25 of the rod 24. The lens portion 31 preferably has a conical region tapering towards the first end of the fiber optic filament 30. In an ideal embodiment, the lens portion 31 has a length defined between the first end of the fiber optic filament 30 and the upper end 25 of the rod 24 between about 6 and 8 inches. The lens portion 31 and the elongate portion 32 are generally coaxial with the rod 24. In use, the lens portion 31 is illuminated by light from the light source 18 passing through the elongate portion 32 such that the lens portion 31 glows when the light source 18 is illuminated.

With reference to FIG. 6, optionally a second fiber optic filament 35 may also be provided. In use, this filament 35 may be inserted into the primary bore 15 of the base instead of the rod 24. The second fiber optic filament 35 has first and second ends and a lens portion 36, and an insertion portion 37. The lens portion 36 is positioned towards the first end of the second fiber optic filament 35 and the insertion portion 37 is positioned adjacent the second end of the second fiber optic filament 35. The insertion portion 37 has a diameter less than the diameter of the lens portion 36 of the second fiber optic filament 35. The second fiber optic filament 35 also has an annular gasket 38 around it. The annular gasket 38 is positioned on the lens portion 36 of the second fiber optic filament 35 towards the second end of the second fiber optic filament 35. Like the rod, the second end of the second fiber optic filament 35 may be inserted into the primary bore 15 of the base 11 such that the annular gasket 38 of the second fiber optic filament 35 is rested on the shoulder of the primary bore. Preferably, the second end of the second fiber optic filament 35 has a hole 39 therein for receiving the light source 18 in the primary bore 15.

Figure 4:
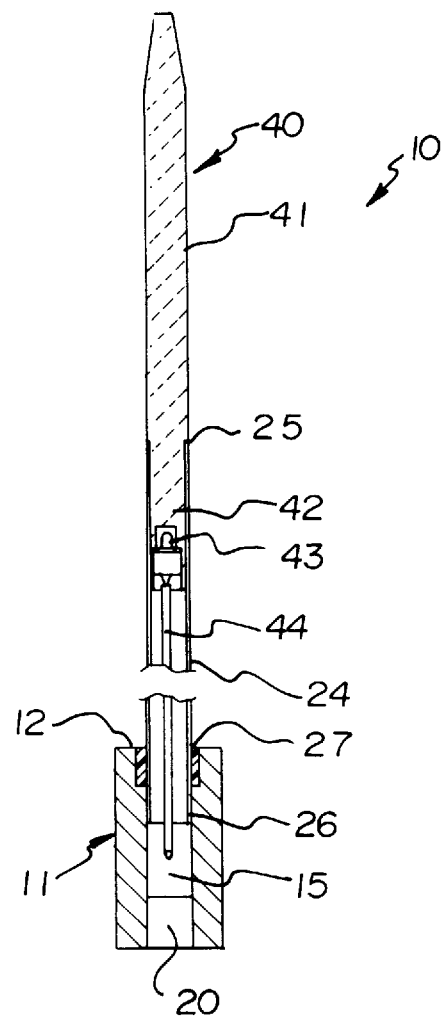
FIG. 4 is a schematic sectional view of an optional embodiment of the present invention.

In an additional optional embodiment, as illustrated in FIGS. 4 and 5, the fiber optic filament is excluded from the lumen of the rod. In this embodiment, a third fiber optic filament 40 is provided having first and second ends and a lens portion 41, and an insertion portion 42. The lens portion 41 is positioned towards the first end of the third fiber optic filament 40 and the insertion portion 42 is positioned adjacent the second end of the third fiber optic filament 40. The insertion portion 42 has a diameter less than the diameter of the lens portion 41 of the third fiber optic filament 40. In this embodiment, the second end of the third fiber optic filament 40 is insertable into the upper end 25 of the rod 24. In this embodiment, the light source is not provided in the base. Instead, a light source 43, such as a LED, is inserted into the second end of the third fiber optic filament 40. Alternatively, the light source 43 may be embedded in the second end of the third fiber optic filament 40. This light source 43 is electrically connectable to a power source by a wire 44 running through the rod and the base.

In use, the base is attached to a portion of a bumper of a vehicle, preferably adjacent an end of the bumper. Illumination of the light source illuminates the lens portion of the filaments so that they glow along the length of the lens portion to help indicate the position of the end of the bumper to which the base of the lighted bumper guide 10 is attached.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lighted bumper guide adapted for attachment to a bumper of a vehicle, said lighted bumper guide comprising:

a base having a top, a bottom, and a side, said base being adapted for attachment to a bumper;

said top of said base having a primary bore therein;

said primary bore having upper and lower portions, said upper and lower portions of said primary bore being generally cylindrical and each having a diameter, said diameter of said upper portion of said primary bore being greater than said diameter of said lower portion of said primary bore, said upper and lower portions of said primary bore forming an annular shoulder therebetween;

a light source being provided in said lower portion of said primary bore;

an elongate tubular rod having a lumen, and opposite upper and lower ends;

said rod having an annular gasket extending therearound, said gasket being positioned towards said lower end of said rod;

said lower end of said rod being inserted into said primary bore of said base, said gasket being inserted into said upper portion of said primary bore such that said gasket rests on said shoulder defined between said upper and lower portions of said primary bore;

an elongate fiber optic filament having opposite first and second ends, a lens portion and an elongate portion, said lens portion being located towards said first end of said fiber optic filament, said elongate portion being located towards said second end of said fiber optic filament;

said elongate portion of said fiber optic filament being provided in said lumen of said rod, said second end of said fiber optic filament being positioned adjacent said lower end of said rod; and said lens portion of said fiber optic filament being upwardly extended from said upper end of said rod.

2. The lighted bumper guide of claim 1, wherein said bottom end of said base has a secondary bore therein, said secondary bore being generally cylindrical, said secondary bore being adapted for attachment to a bumper of a vehicle.

3. The lighted bumper guide of claim 2, wherein said secondary bore is generally coaxial with said primary bore, and wherein said secondary bore is threaded.

4. The lighted bumper guide of claim 1, wherein said side of said base has a pair of spaced apart mounting holes being therein, one of said mounting holes being extended into lower portion of said primary bore, another of said mounting holes being extended into said secondary bore, said mounting holes being adapted for attaching said base to a bumper.

5. The lighted bumper guide of claim 1, said rod has an offset located towards said lower end of said rod.

6. The lighted bumper guide of claim 1, wherein a plurality of heat shrink strips are wrapped around said elongate portion.

7. The lighted bumper guide of claim 1, wherein said lens portion has a conical region tapering towards said first end of said fiber optic filament, and said lens portion has a length defined between said first end of said fiber optic filament and said upper end of said rod between about 6 and 8 inches.

8. The lighted bumper guide of claim 1, further comprising a second fiber optic filament having first and second ends and a lens portion, and an insertion portion, said lens portion being positioned towards said first end of said second fiber optic filament, said insertion portion being positioned adjacent said second end of said second fiber optic filament, said insertion portion having a diameter and said lens portion having a diameter, wherein said diameter of said insertion portion of said second fiber optic filament being less than said diameter of said lens portion of said second fiber optic filament; and said second fiber optic filament having an annular gasket therearound, said annular gasket being positioned on said lens portion of said second fiber optic filament towards said second end of said second fiber optic filament, said second end of said second fiber optic filament being insertable into said primary bore of said base such that said annular gasket of said second fiber optic filament is rested on said shoulder of said primary bore.

9. The lighted bumper guide of claim 8 wherein said second end of said second fiber optic filament has a hole therein for receiving said light source in said primary bore.

10. A lighted bumper guide adapted for attachment to a bumper of a vehicle, said lighted bumper guide comprising:

a base having a top, a bottom, and a side, said base being adapted for attachment to a bumper;

said top of said base having a primary bore therein;

said primary bore having upper and lower portions, said upper and lower portions of said primary bore being generally cylindrical and each having a diameter, said diameter of said upper portion of said primary bore being greater than said diameter of said lower portion of said primary bore, said upper and lower portions of said primary bore forming an annular shoulder therebetween;

a light source being provided in said lower portion of said primary bore;

said bottom end of said base having a secondary bore therein, said secondary bore being generally cylindrical and being generally coaxial with said primary bore, said secondary bore being threaded, said secondary bore being adapted for attachment to a bumper of a vehicle said side of said base having a pair of spaced apart mounting holes being therein, one of said mounting holes being extended into lower portion of said primary bore, another of said mounting holes being extended into said secondary bore, said mounting holes being adapted for attaching said base to a bumper;

an elongate tubular rod having a lumen, and opposite upper and lower ends, said rod having an offset located towards said lower end of said rod;

said rod having an annular gasket extending therearound, said gasket being positioned towards said lower end of said rod;

said lower end of said rod being inserted into said primary bore of said base, said gasket being inserted into said upper portion of said primary bore such that said gasket rests on said shoulder defined between said upper and lower portions of said primary bore;

an elongate fiber optic filament having opposite first and second ends, a lens portion and an elongate portion, said lens portion being located towards said first end of said fiber optic filament, said elongate portion being located towards said second end of said fiber optic filament, said fiber optic filament having a generally circular cross section;

said elongate portion of said fiber optic filament being provided in said lumen of said rod, said second end of said fiber optic filament being positioned adjacent said lower end of said rod;

a plurality of heat shrink strips being wrapped around said elongate portion;

said lens portion of said fiber optic filament being upwardly extended from said upper end of said rod;

said lens portion having a conical region tapering towards said first end of said fiber optic filament;

said lens portion having a length defined between said first end of said fiber optic filament and said upper end of said rod, wherein said length of said lens portion is between about 6 and 8 inches;

a second fiber optic filament having first and second ends and a lens portion, and an insertion portion, said lens portion being positioned towards said first end of said second fiber optic filament, said insertion portion being positioned adjacent said second end of said second fiber optic filament, said insertion portion having a diameter and said lens portion having a diameter, wherein said diameter of said insertion portion of said second fiber optic filament being less than said diameter of said lens portion of said second fiber optic filament;

said second fiber optic filament having an annular gasket therearound, said annular gasket being positioned on said lens portion of said second fiber optic filament towards said second end of said second fiber optic filament, said second end of said second fiber optic filament being insertable into said primary bore of said base such that said annular gasket of said second fiber optic filament is rested on said shoulder of said primary bore; and said second end of said second fiber optic filament having a hole therein for receiving said light source in said primary bore.

11. A lighted bumper guide adapted for attachment to a bumper of a vehicle, said lighted bumper guide comprising:

a base having a top, a bottom, and a side, said base being adapted for attachment to a bumper;

said top of said base having a primary bore therein;

said primary bore having upper and lower portions, said upper and lower portions of said primary bore being generally cylindrical and each having a diameter, said diameter of said upper portion of said primary bore being greater than said diameter of said lower portion of said primary bore, said upper and lower portions of said primary bore forming an annular shoulder therebetween;

an elongate tubular rod having a lumen, and opposite upper and lower ends;

said rod having an annular gasket extending therearound, said gasket being positioned towards said lower end of said rod;

said lower end of said rod being inserted into said primary bore of said base, said gasket being inserted into said upper portion of said primary bore such that said gasket rests on said shoulder defined between said upper and lower portions of said primary bore;

a third fiber optic filament having first and second ends and a lens portion, and an insertion portion, said lens portion being positioned towards said first end of said third fiber optic filament, said insertion portion being positioned adjacent said second end of said third fiber optic filament;

said insertion portion of said third fiber optic filament having a diameter and said lens portion having a diameter, wherein said diameter of said insertion portion of said third fiber optic filament being less than said diameter of said lens portion of said third fiber optic filament;

said second end of said third fiber optic filament being inserted into said upper end of said rod; and a light source being provided in said second end of said third fiber optic filament, said light source being electrically connectable to a power source.

* * * * *